March 25, 1952 R. F. BECK 2,590,368
VALVE
Filed March 6, 1945
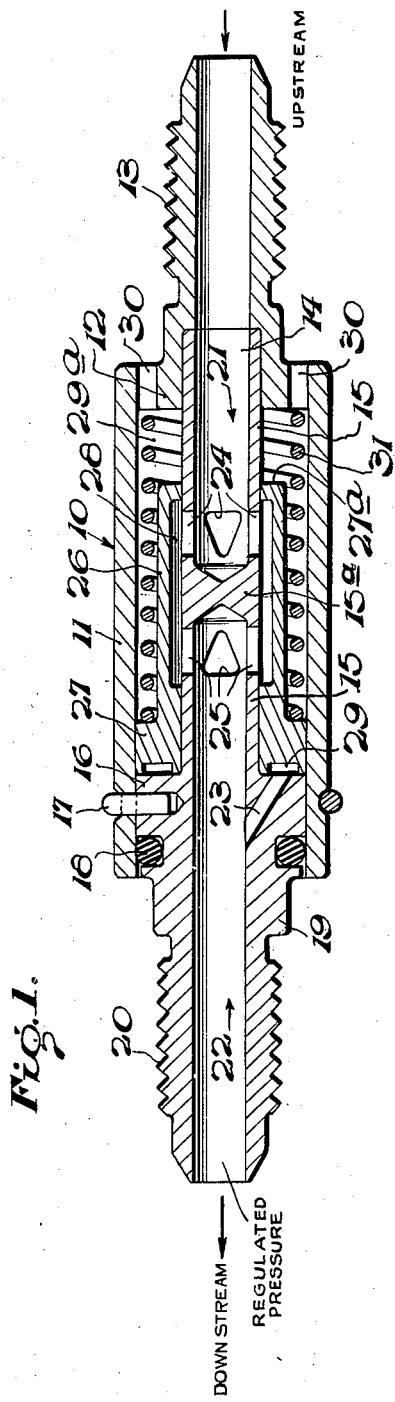
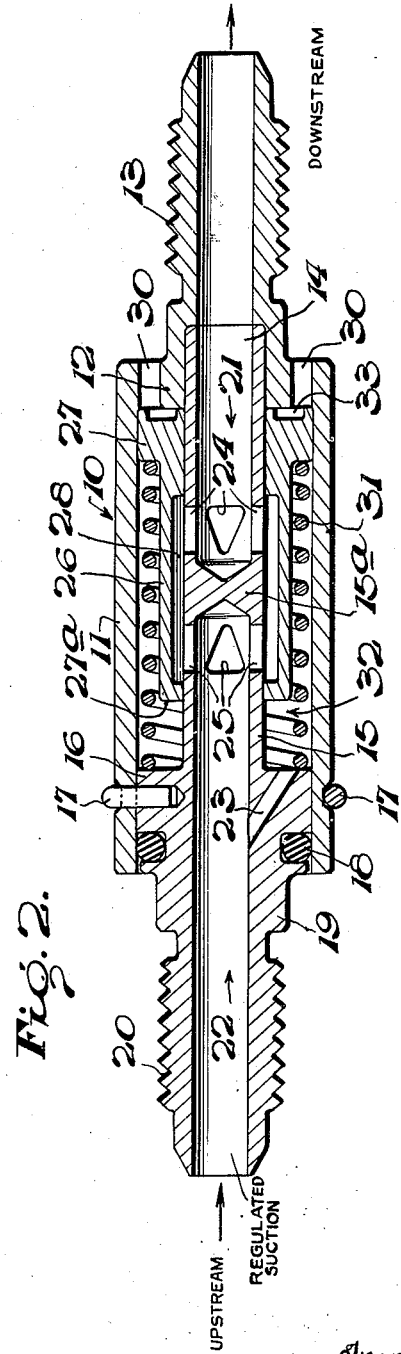
Inventor
Robert F. Beck Patented Mar. 25, 1952

2,590,368

UNITED STATES PATENT OFFICE 2,590,368

VALVE

Robert F. Beck, Paterson, N. J., assignor to Bendix Aviation Corporation, Teterboro, N. J., a corporation of Delaware Application March 6, 1945, Serial No. 581,250

7 Claims. (Cl. 50—35)

1

My invention relates to valves and more particularly to valves of the throttling type.

One of the objects of my invention is to provide a valve of the foregoing described character which is equipped with flow responsive means of a relatively high sensitivity for controlling pressure of a fluid flowing therethrough in a manner whereby instruments and devices of a sensitive and precisional type may be accurately operated.

Another object of my invention is to provide a valve of the foregoing described character wherein the flow responsive means may be readily arranged or transposed to adapt the valve for use in controlling either pressure or suction.

A further object of my invention is to provide a valve of the foregoing described character which is equipped with means for maintaining pressure at a desired value and which may be readily replaced to modify or change the value.

An important object of my invention is to provide a valve of the foregoing described character which is simple in construction, durable in use, efficient in operation, economical in manufacture, easy of installation and which lends itself to mass production.

With the above and other objects in view, as will hereinafter appear, the invention consists in the combination and arrangement of parts hereinafter set forth and illustrated in the accompanying drawings, from which the several features of the invention and the advantages attained thereby will be readily understood by those skilled in the art.

Referring to the drawings wherein like reference characters designate like parts throughout the several views.

Figure 1 is a longitudinal sectional view of my valve arranged for regulating and maintaining positive pressure therethrough at a predetermined value;

Figure 2 is a view similar to Figure 1 with certain of the parts being rearranged or transposed for use in regulating negative pressure or suction.

In the form of the invention disclosed in Figure 1 of the drawings, the valve 10 is of an air throttling type adapted to be employed in a system for operating various pressure operated instruments and devices and when so employed it is located in the system between an air source and the instrument or device to be operated whereby the air pressure to the device is regulated in accordance with a desired pressure, one example of its many uses being in the maintaining of a constant air pressure in the fuel tank of an aircraft or the like. As disclosed, the valve 10

2 comprises a housing member 11 which is open at one end and provided with a wall 12 at the opposite end, the wall 12 being formed with a fitting 13 for connection to a pipe or the like leading from the fluid pressure source or upstream of the aforementioned system. The fitting 13 is provided with a bore formed inwardly with a counter bore constituting a seat in which is seated the inner end section 14 of a pilot member 15 disposed in the housing member and formed with a collar 16 closing the open end of the housing member and secured thereto by means of a detachable ring 17.

The collar 16 is formed with a circumferential groove in which is contained a suitable packing 18 forming a seal between the collar and housing member 11. The outer end section 19 of the pilot member is formed with a fitting 20, similar to the fitting 13 for connection to a pipe or the like leading to the fluid pressure operated element or the downstream of the valve. The inner and outer end sections 14 and 19 of the pilot member are provided with axially aligned spaced passages 21 and 22 respectively and which are separated by a wall or partition 15a. The inner radial face of the collar 16 is formed with an outlet aperture 23 which communicates with the passage 22. On one side of the partition 15a, the circumferential face of the pilot member is formed with a plurality of triangular-shaped ports 24 communicating with the passage 21 and on the other side with similarly shaped ports 25 communicating with the passage 22.

Slidably mounted upon the pilot member 15 is a sleeve constituting a valve member 26 which is formed, on the end adjacent the collar 16, with a head 27 and, on its opposite end with a stop face 27a for engagement with the wall 12 to limit its movement. The member 26 is also formed on its inner circumferential face, with a channel 28 about the pilot member for effecting communication between the ports 24 and 25. The head 27 has abutting engagement with the collar 16 and its inner edge serves to control the ports 25 upon movement of the valve member relative to the pilot member as hereinafter more fully described. The valve member 26 coacts with the pilot member 15 to define a pair of positive pressure and atmospheric chambers 29 and 29a respectively, within the housing. The chamber 29a communicates with the atmosphere by means of inlet openings 30 formed in the wall 12 whereby atmospheric pressure is always present in the chamber 29a, while the chamber 29 communicates with the passage 22 by means of the aperture 23. Disposed about the valve member is a spring 31 having one end member engaging the head 27 and the opposite end engaging the end wall 12, said spring serving to urge the valve member toward the collar 16 to maintain communication between the ports 24 and 25 through the channel 28.

In operation, the parts being in the positions disclosed in Fig. 1, air from the upstream of the system is introduced into the passage 21 of the pilot member and into the channel 28 of the valve member through the ports 24 and from the channel 28 into the passage 22 through the ports 25. When the pressure within the passage 22 rises to a sufficient differential over the atmospheric pressure within the chamber 29, the valve member 26 will be moved towards the end wall 12 by pressure acting against the lefthand face of the head 27 through the aperture 23 and against the force of the spring 31 thus causing the head to gradually restrict or close the ports 25 until the pressure in the passage 22 decreases sufficiently to permit reverse movement of the valve member upon a decrease of the pressure in line 21. Obviously, by selecting the spring with a desired free length and stiffness, the pressure in the passage 22 is limited to a desired value and only a slight variation of the pressure in the passage 22 will be obtained upon flow variations in the passage 21, the amount of variation in the passage 22 depending upon the stated characteristics of the spring, it being understood that the spring may be readily replaced by another of different characteristics and thus condition the valve member to maintain substantially another desired pressure value in the passage 22.

By removing the ring 17 and disassembling the housing and pilot members, the valve member 26 and spring 31 may be transposed and rearranged within the valve when the housing and pilot members are reassembled thus converting the valve into one of the instrument suction throttling type as illustrated in Figure 2 of the drawing and which is adapted to be employed in a system for regulating suction, i. e. below atmospheric pressure, for applications such as instrument operation. When so employed, the valve is located between a high or varying suction source and the instrument or chamber in which the suction is to be regulated, a specific application being the operation of a gyro-compass, turn and bank indicator and/or artificial horizon from an unsupercharged engine manifold in relatively light aircraft. When the valve is thus converted, the fitting 13 is adapted to be connected to a pipe or the like leading to the suction pump downstream of the valve while the fitting 20 is adapted to be connected to a pipe or the like leading to the instrument to be operated upstream of the valve. Transposition of the valve member and spring disposes the head 27 of the valve member adjacent the wall 12 while the spring 31 is interposed between the head 27 and collar 16. The head 27 coacts with the housing and pilot members to define a pair of expansible suction and atmospheric chambers 32 and 33 respectively, within the housing member. The chamber 33 communicates with the atmosphere by means of the inlet openings 30 formed as in Fig. 1 in the wall 12 of the housing member whereby atmospheric pressure is always present in the chamber 33, while the chamber 32 communicates with the passage 22 by means of the aperture 23. The face 27a of the valve member or piston has abutting engagement with the collar 16 to limit its movement while the inner edge of the head 27 serves to control the ports 24 to regulate communication between the passage 21 and the channel 28 as hereinafter made apparent. The spring 31 serves to urge the valve member 26 away from the collar 16 to tend to open the ports 24 to effect communication between the passages 21 and 22 through the ports 24 and 25, the aperture 23 and chamber 32.

In the operation of the valve as disclosed in Figure 2, on starting of the engine or operation of another suction means, the valve member abuts the wall 12, due to the lowering of pressure in the chamber 32, and hence effects communication between the passages 21 and 22 by the action of the spring 31 with the result that instrument operation is had due to the connection of line 22 to suction. When the differential pressure between atmospheric and regulated suction times the projected area of the valve member exceeds the force of the spring, the valve member will be actuated towards the collar 16 to gradually close the ports 24. Obviously, the suction will be regulated within limits dependent upon the characteristics of the spring since throttling of the flow by restricting or closing the ports 24 will reduce the regulated suction in line 22.

It is to be understood that the language used herein and in the claims is intended to cover all the generic and specific features of the invention herein described, and all statements of the scope of the invention which, as a matter of language, may be said to fall therebetween. Furthermore, the terms "inner," "outer," and "end" are used in a relative sense for the purpose of description and not by way of limitation, it being understood, in some instances, that the various parts of the invention may be arranged in a manner whereby the foregoing terms would not appropriately describe their relative positions.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described uses therefor as it may be utilized for any purpose to which it is adaptable. It is therefore to be understood that the invention is not limited to the specific constructions as illustrated and described as the same being only illustrative of the principles of operation which are capable of extended application in various forms, and that the invention comprehends all construction within the scope of the appended claims.

What is claimed is:

1. A through-flow throttling valve including a chamber, an inflow passage, an outflow passage, a port-opening for each passage symmetrically disposed relatively to the center of said chamber, a valve means dividing the chamber and cooperating with the port openings, apertures respectively connecting the separate parts of the chamber with one of the passages and with a source of reference pressure, and a spring coacting with the valve means to oppose the differential pressure across the valve means, the spring and the valve means operating as a unit which may be axially reversed end for end between one position and another to maintain the spring and the valve means in given relation to each other characterized in that the valve means and ports are constructed and arranged to provide regulation of the pressure in the aperture-connected passage in a positive-pressure sense when said unit is in one of said positions and in a negative-pressure or suction sense when said unit is in the other of said positions.

2. The throttling valve set forth in claim 1 in which the valve includes a housing having a removable member such that the change from pressure to suction control is obtained by removing the member, removing the unit, reversing the unit as aforesaid, replacing the reversed unit in the housing, and replacing the member.

3. In a throttling valve, the combination of a housing containing a cylindrical chamber with one end connected by a first aperture to the atmosphere, a cylindrical pilot member extending concentrically through said housing and said chamber and containing separate inlet and outlet passages with port openings into the chamber symmetrically located with respect to the center of the chamber, a second aperture connecting the passage at the end opposite the first aperture with the chamber, an unsymmetrical annular-piston valve slidably mounted within the chamber to divide the chamber and slidably mounted upon the pilot member to connect the passages together while throttling a port opening, and a spring located to bias the valve in a direction to oppose the differential across the piston, said piston valve and spring means operating as a unit which may be axially reversed end for end between one position and another to maintain the piston and the spring means in given relation to each other by which construction the pressure is regulated in the passage containing the second aperture in a positive-pressure sense when said unit is in one of said positions and in a suction or negative-pressure sense when said unit is in the other of said positions.

4. In combination, a housing enclosing a chamber having duct means for communication with a source of reference pressure, a pilot member having a bore and including a portion in the housing and chamber and having a bore block and inlet and outlet means with port means to the chamber at opposite sides of said block, said port means being symmetrically positioned relative to the center of said chamber, second duct means connecting the bore of the pilot member with the chamber at a side of the block opposite that of the first duct means, a piston valve slidably mounted in and dividing the chamber and slidably mounted on the pilot member to connect the inlet and outlet means while throttling one of the port means, and spring means biasing the valve in opposition to differential pressure between opposite sides of the piston, said piston valve and spring means operating as a unit which may be axially reversed end for end between one position and another to maintain the piston and spring means in given relation to each other, by which construction the pressure is regulated in the part of the pilot member containing the second duct means in a positive pressure sense when the unit is in one of said positions and in a negative pressure sense when the unit is in the other of said positions.

5. In a valve structure, a housing having an end wall formed with an aperture communicating with the atmosphere, a blocked conduit extending through said housing and provided with a flange closing the other end of said housing, said conduit having a partition intermediate its ends dividing the conduit into longitudinally spaced axially disposed inlet and outlet passages and formed with inlet and outlet ports for communication between said passages, said inlet and outlet ports being disposed equi-distant from the end wall and flange respectively, said flange being formed with an opening effecting communication between the proximal passage and the interior of said housing independently of said ports, a spring, a valve member pressed by said spring and longitudinally slidable on said conduit for controlling said ports, said valve member coacting with said housing and conduit to define when the first mentioned end is upstream atmospheric and regulated pressure chambers within said housing about said conduit and adjacent said end wall and flange respectively, said flange and conduit being detachable from said housing to permit said valve member to be axially reversed, end for end, on said conduit to define, when the first mentioned end is downstream atmospheric and suction chambers about said conduit and adjacent said end wall and said flange respectively, said valve member being effective for controlling communication between said inlet and outlet passages in response to a pressure differential between said opening and the distant passage.

6. In a valve structure, a housing, an end wall partially closing one end of said housing and including inlet means, a pilot member having a bore, one end of said pilot member being mounted in said end wall with the bore thereof in alignment with the inlet, a flange on said pilot member forming the other end wall of said housing and defining with said first end wall a chamber within said housing, outlet means on said pilot member extending beyond said housing and in alignment with the inlet means, a partition in said bore positioned centrally of said chamber and defining inlet and outlet passages in said pilot member, port means for said inlet and outlet passages symmetrically disposed relative to the partition and the center of the chamber, a piston valve slidably and sealingly mounted on said pilot member and including means for connecting the inlet and outlet passages through said port means and for throttling one of said port means, a head on said piston valve slidably and sealingly engaging the wall of said chamber, resilient means biasing said piston valve in the direction of the flange on the pilot member, a duct in said first end wall for placing said chamber and one side of said piston head in communication with a reference pressure, and a second duct connecting the other side of said piston head to the outlet passage in said pilot member, whereby said piston valve is actuated in response to a pressure differential between said reference pressure and the pressure in said outlet passage to throttle one of the port means in said pilot member, said piston valve and resilient means being adapted to be reversely positioned on said pilot member whereby said piston valve operates to throttle the other of said port means in response to said pressure differential.

7. A throttling valve comprising a housing, a pressure chamber within said housing, a pilot member concentrically mounted in said housing, a central bore in said pilot member forming pressure inlet and outlet passages for said valve, a partition in said bore closing communication between the inlet and outlet passages, inlet and outlet ports in the inlet and outlet passages positioned symmetrically relative to the center of the pressure chamber, a piston valve slidably and sealingly mounted on said pilot member and including means for connecting said inlet and outlet passages through said inlet and outlet ports and means for throttling the outlet port, a piston head on said piston valve slidably and sealingly engaging the wall of said pressure chamber, a duct placing said pressure chamber and one side of said piston head in communication with a reference pressure, a second duct between said outlet passage and the other side of said piston head whereby said piston valve is actuated to throttle said outlet port in response to a pressure differential between said reference pressure and the pressure in said outlet passage, and spring means normally biasing said piston valve in opposition to the pressure differential, said pilot member, piston valve and spring means being so constructed and arranged that the piston valve and spring means may be inversely positioned on said pilot member to the end that said inlet port may be throttled by said piston valve in response to the pressure differential between reference pressure and the pressure in said outlet passage.

ROBERT F. BECK.

REFERENCES CITED

The following references are of record in the file of this patent:

UNITED STATES PATENTS

| Number | Name | Date |
|---|---|---|
| 614,441 | Burnett | Nov. 22, 1898 |
| 1,136,619 | Sage | Apr. 20, 1915 |
| 1,343,375 | Peppercorn | June 15, 1920 |
| 1,589,224 | Robe | June 15, 1926 |
| 1,900,514 | McLean | Mar. 7, 1933 |
| 2,005,813 | Thorsen | Jan. 25, 1935 |
| 2,488,647 | Teague | Nov. 22, 1949 |